July 26, 1966 E. O. THOMPSON 3,262,735
DENTAL APPARATUS

Filed April 23, 1963 4 Sheets-Sheet 1

INVENTOR.
ELBERT O. THOMPSON
BY *Robert R. Finch*
ATTORNEY

INVENTOR.
ELBERT O. THOMPSON
BY Robert Q. Finch
ATTORNEY

July 26, 1966  E. O. THOMPSON  3,262,735
DENTAL APPARATUS

Filed April 23, 1963  4 Sheets-Sheet 3

INVENTOR.
ELBERT O. THOMPSON
BY Robert R. Finch
ATTORNEY

# United States Patent Office 3,262,735
Patented July 26, 1966

3,262,735
DENTAL APPARATUS
Elbert O. Thompson, 3535 Hillside Lane,
Salt Lake City, Utah
Filed Apr. 23, 1963, Ser. No. 275,001
6 Claims. (Cl. 297—188)

The present invention relates to the field of dentistry and in particular to improved dental apparatus by which the formidable dental unit is replaced by a simple, unobtrusive yet highly efficient structure housing most all electric, air, water and vacuum dental instruments utilized in the operatory.

Science and industry have contributed much in the way of improved instruments and laboratory techniques to bring dentistry to its present highly developed state. However, despite these technological advances, only scant attention has been paid to the important subject of patient comfort and efficiency of the dentist in the operatory. Hence, even in these modern times the patient is faced with the aesthetically revolting dental unit while the dentist is forced to conform his activities to the limitations imposed by the currently employed cumbersome dental units.

The result is that patients have retained their fear of the dental operatory while dentists have continued to be subjected to much physical discomfort and loss of efficiency.

As noted, the problems enumerated stem from the familiar dental unit which is a sizeable structure fixed firmly in place on the operatory floor near the dental chair. This unit houses power sources, disposal receptacles and drains; and carries an external array of arms, cables, pulleys for driving the instruments. Not only does this cause patient discomfort but, equally important, it limits the dentist's activity because he is forced to work only in the area reachable by the appendages of the unit. Moreover, any change in the dentist's position relative to the unit contributes directly to further inefficiency because any such change means that he must now reach to a different location for the required instrument.

In brief, then, the present invention overcomes the foregoing problems by eliminating the dental unit as such and replacing it with apparatus that is aesthetically pleasing and at the same time enables location of the instruments in relatively fixed juxtaposition to the patient and dentist to the end, inter alia, that without regard to the instruments, the patient and dentist may each assume the most comfortable and convenient position; and the dentist is able to give undivided attention to use of the instruments rather than having to relocate them between each use.

It is therefore a primary object of this invention to provide apparatus specifically adapted to use in a dental operatory and containing or housing all required dental instruments in their most logical position for use by the dentist whether he be seated or standing.

It is a further important object to provide such apparatus of a construction to include a mobile housing or unit carrying the instruments; and a functionally connected but remote fixed unit housing the power units and waste discard components required by the instruments. As a result, the cumbersome dental unit is eliminated along with all of the auxiliary hoses, cords, bracket arms, motors and the like inevitably appended thereto.

A still further and related object is the provision of apparatus of the type described in which the mobile unit housing the dental instruments with their associated hoses and cords is mounted on the dental chair to be movable therewith and, in the preferred embodiment, to be also movable relative to the chair thereby to enable positioning of the instruments in the most convenient location relative to the attitude of the chair as well as the size of the patient.

In order that the invention may be more readily understood and carried into effect, reference is made to the accompanying drawings and their description which are offered by way of illustration and are not to be taken as limiting the invention, the scope of which is defined by the appended claims and their equivalents rather than by any preceding description.

Referring first to FIGS. 1–4, it will be seen that the total system comprises a pedestal-mounted dental chair 15, a fixed power source and waste disposal housing 16, an auxiliary operating cabinet 17 and a mobile instrument and hose housing or mobile unit 18 attached to the chair and movable therewith and relative thereto; all as hereinafter explained in greater detail.

Figure 1:
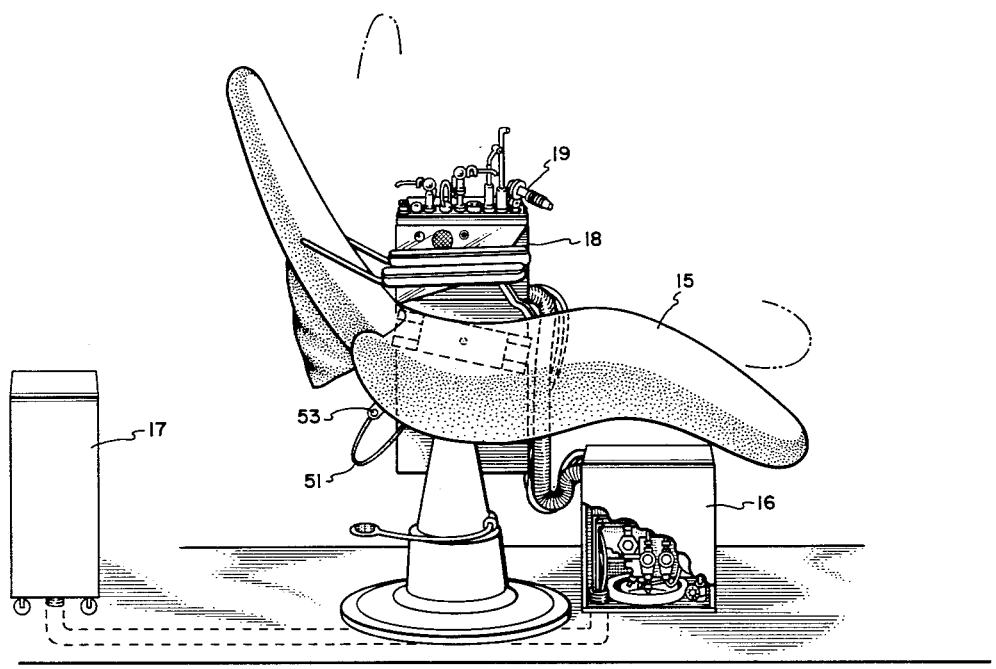
FIG. 1 is a side elevational view of a dental chair and a particular embodiment of the invention, certain hidden parts being shown in dotted lines for purposes of clarity.
Figure 3:
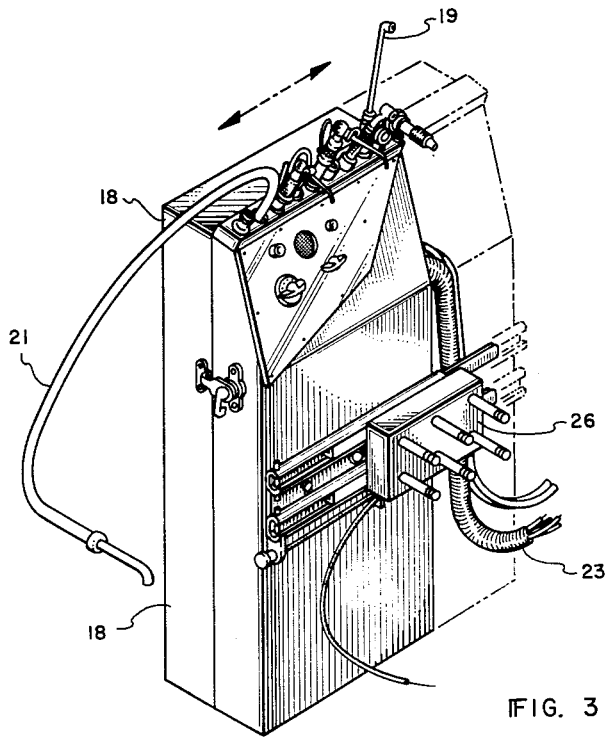
FIG. 3 is an enlarged isometric view of the mobile instrument housing illustrated in FIGS. 1 and 2.
Figure 4:
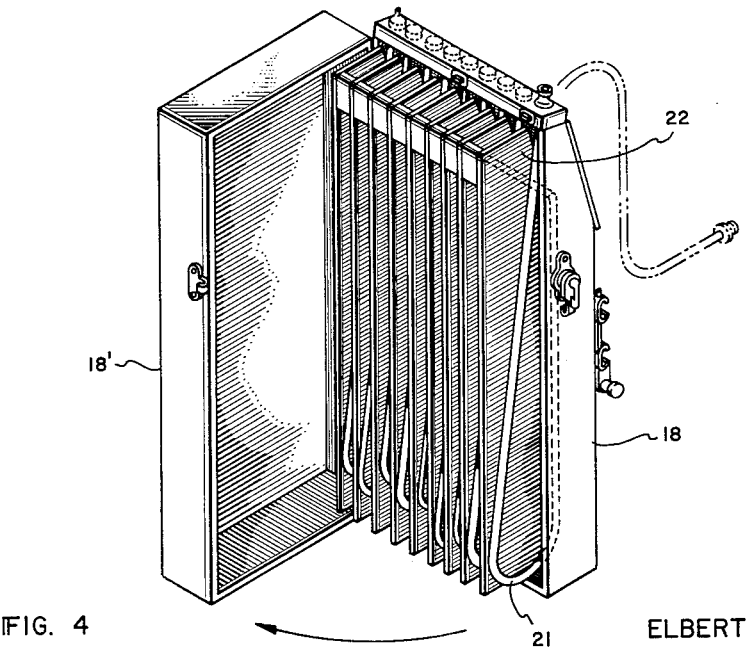
FIG. 4 is another isometric view of the instrument housing taken from a different angle but with the cover open to illustrate interior details.
Figure 7:
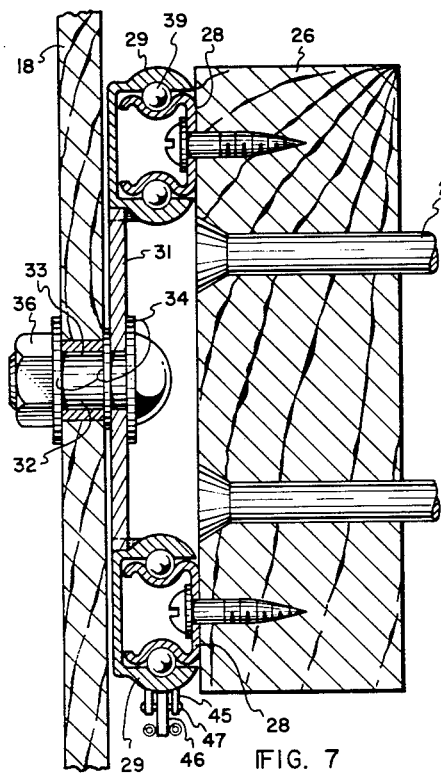
FIG. 7 is an enlargement of a view taken in the plane of line 7—7 of FIG. 5.
Figure 5:
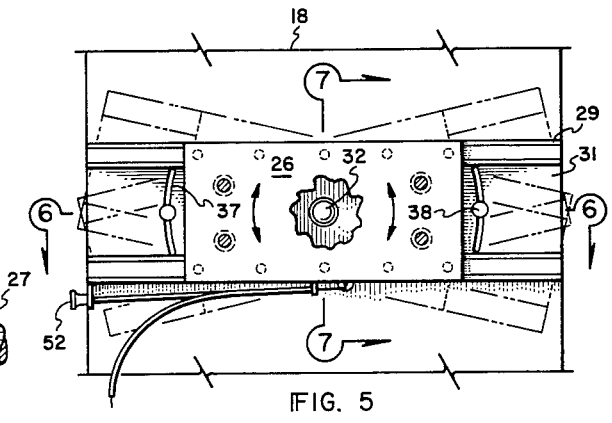
FIG. 5 is a front elevational view of the mounting arrangement by which the mobile housing is secured to the chair in the embodiment of FIG. 1; certain parts being cut away for purposes of clarity and dotted lines employed to illustrate relative movement between certain of the parts.
Figure 6:
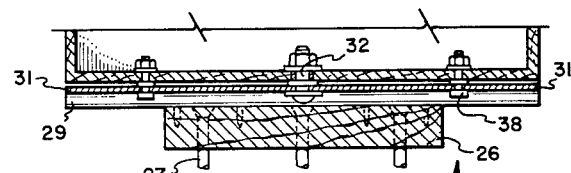
FIG. 6 is a sectional view taken in the plane of line 6—6 of FIG. 5.

As is most clearly seen in FIGS. 1, 3 and 4, the instruments held by housing 18 may include the entire selection necessary for any required work. Such instruments are generally designated 19 and their associated hoses or cords are generally designated 21. The interior of the mobile unit or housing is divided by a plurality of baffles or dividers 22 into separate compartments in which individual hoses or cords may repose when the associated instrument is not in use. The separate compartments serve to prevent tangling of the hoses and cords thereby enhancing their availability. For ease of access, the housing 18 is provided with a closure 18'. All instrument hoses and cords are led therefrom through a common flexible tube 23 which may be called an "umbilical cord." The tube 23 leads to the separate fixed housing 16 wherein there reposes suitable power sources and waste disposal receptacles as required to meet the needs of the system. These are generally illustrated in FIG. 1, in the cut away portion of the housing 16.

Figures 8, 9:
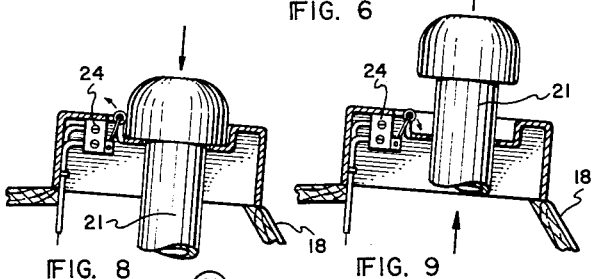
FIG. 8 is an enlarged view illustrating the manner in which an instrument may be associated with a micro switch in the housing, the switch being shown in the open position.
FIG. 9 is a view similar to FIG. 8 but with the instrument removed from its resting place in the housing and the micro switch in the closed or on position.
Figure 11:
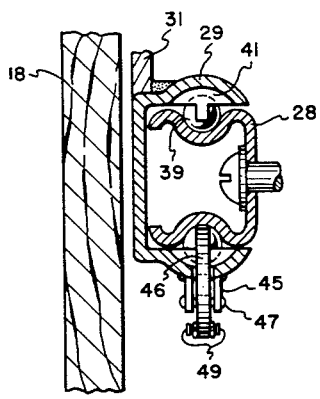
FIG. 11 is a view taken in the plane of line 11—11 of FIG. 10.
Figure 10:
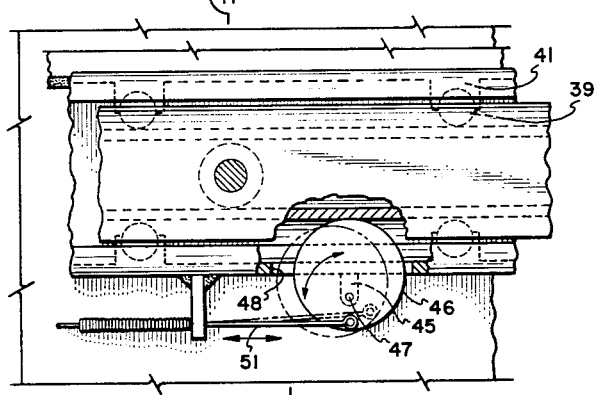
FIG. 10 is an enlarged partial view of the structure of FIG. 5 and is partially cut away to illustrate details of the locking mechanism for holding the housing in any desired position on the tracks.

In accordance with the invention, necessary on and off switches are provided on the instrument housing. A typical switch arrangement is illustrated in FIGS. 8 and 9 where it will be noted that when the instrument holder is seated it bears against and opens micro switch 24. When the instrument holder is moved from its seat, pressure on the switch is released and it closes to energize the instrument by a suitable circuitry working back through the umbilical cord to the power source in housing 16, or, in some cases, cabinet 17. In this connection, it will be noted that the operating cabinet 17 is in effect an auxiliary station serving special instruments and may or may not be provided depending on requirements of the particular system. However, when provided, it also serves as a remote unit serving the instrument housing only through the basic remote fixed unit 16.

As previously noted, the manifold 18 is of a particular construction and is mounted so that it is movable with the chair and also relative thereto while at all times remaining in a vertical position. In a particular embodiment of the invention, the housing is mounted to automatically locate itself in the most convenient position relative to the working area.

In such an arrangement mounting of the housing is effected by a basic mounting block 26 suitably secured to the chair as by bolts 27. Rigidly attached to the base block 26 are spaced apart parallel track members 28 adapted to receive complemental tracks 29 which are in turn formed as an integral part of a mounting plate 31 to which the housing 18 is pivotally attached by means of a central pivot post 32 and its associated bushing 33, bearing washers 34 and retaining nut 36. Additional guiding and support during rotation is provided by arcuate slots 37 cut into the plate 31 and through which stop pins 38 are inserted for attachment to the housing 18.

To facilitate relative movement between the tracks there is conveniently provided a series of ball bearings 39 held in known type retainers 41.

In the arrangement as described, the housing is movable on the chair within the limits provided by the track system. In the particular embodiment shown, the housing is freely pivotable about the axis 32 so that it will at all times hang in a vertical position despite changes in the attitude of the chair that may alter the position of the base block 26 from the neutral position in which the tracks are horizontal. In structures where the chair base does not tilt or where the base block is secured to the pedestal, this is not required since the tracks do not tilt.

Figure 2:
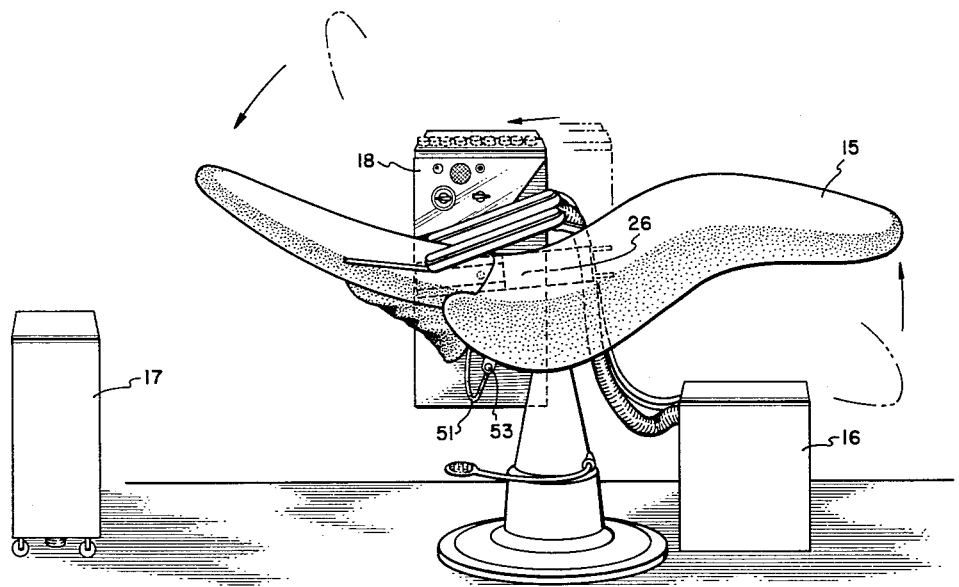
FIG. 2 is a view similar to FIG. 1, illustrating the embodiment of FIG. 1 with the chair in a different position and showing by dotted lines changing location of the instrument housing in response to variations in attitudes of the chair.

The advantage of this arrangement is readily apparent from a persual of FIGS. 1 and 2 where it will be noted that when the chair is in the substantially upright position, the base block 26 may be canted downwardly toward the foot of the chair thus urging the mobile housing in that direction. However, the housing remains upright and may be locked in any desired position as hereinafter described. This positions the working instruments in the proper location relative to the patient.

When the chair has been lowered to the reclining position, as in FIG. 2, the instrument housing remains in the vertical position even though the base 26 has now been canted in the opposite direction toward the patient's head. At the same time, the housing is urged toward the patient's head so that the optimum instrument location may be maintained.

As noted, the manifold may be locked in any one of a variety of positions and this may be done either by the doctor or an assistant working on the opposite side of the chair.

A preferred locking arrangement is illustrated in FIGS. 5, 7 10 and 11. In the structure shown there is provided on the lower track 29 a downwardly extending bracket 45 having a circular disc 46 journalled therein with its axis 47 eccentrically located. The lower portion of the track 29 has a cut-out slot 48 through which the disc or wheel 46 protrudes to come into engagement with the lower part of the track 28. Adjacent the lower peripheral edge of the disc 46 are two studs 49 to which are attached separate flexible cables 51 each leading to control buttons such as 52 (FIG. 5) or 53 (FIGS. 1 and 2). With this arrangement, locking is accomplished by pulling on the cables to rotate the wheel in a clockwise direction (viewed as in FIG. 10) whereby a friction or wedge lock is attained. Release is accomplished simply by reversing the direction of the cables, that is, pushing to rotate the periphery of the wheel out of contact with the inner track 28.

Figure 12:
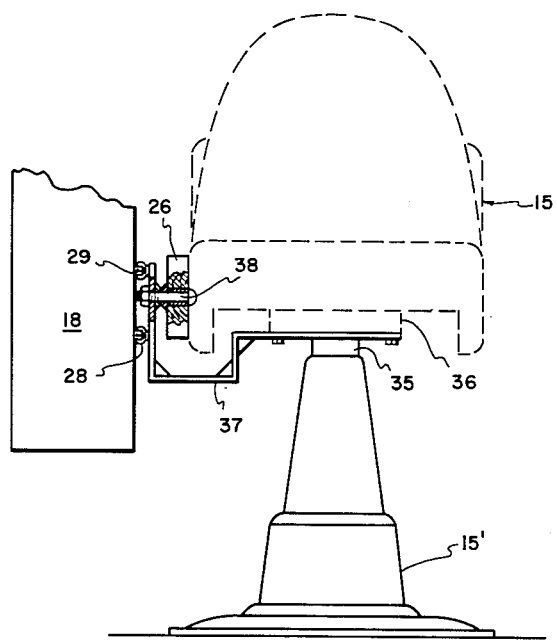
FIG. 12 is a partial back elevational view illustrating a separate embodiment of the invention mounted on a chair of the type shown in FIG. 1.
Figure 13:
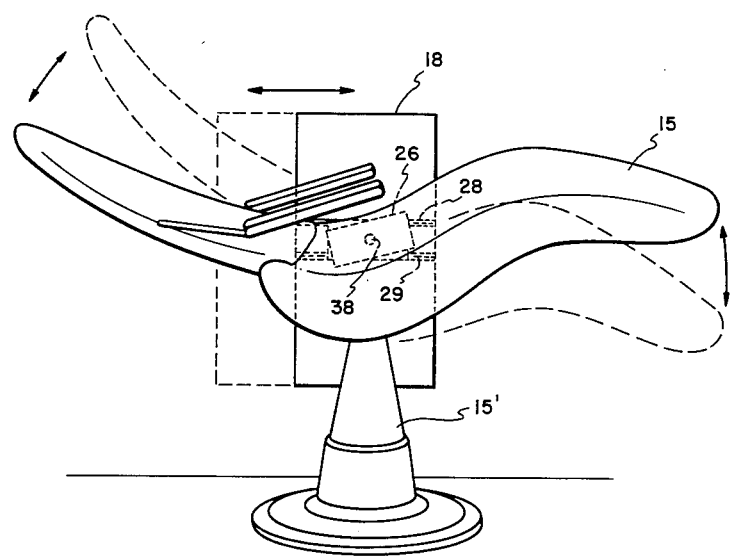
FIG. 13 is a side view as seen from the right of FIG. 12, dotted lines being employed to illustrate motion of certain components.

FIGS. 12 and 13 illustrate a separate embodiment of the invention providing a mounting of the mobile unit to be maintained in the vertical position but without tilting of the tracks.

In these figures, the chair 15 is mounted on the usual pedestal 15' which is provided with a suitable elevating ram 35 to move the chair up and down.

A fixed bracket 36 is secured to the ram on the underside of the chair; and a further bracket 37 is secured, as by bolting, to this bracket.

Bracket 37 is formed to extend from its anchor below the center of the chair laterally outwardly past the sides of the chair thence vertically upwardly alongside the chair.

As in the embodiment of FIGS. 1–4, a block 26 is rigidly secured to the chair. To provide support for the bracket and the mobile unit 18, a pin 38 is rigidly secured to the vertical plate of the bracket to extend inwardly through a suitably bushed bore in the block 26. In connection with the arrangement just described, it is important that the block 26 be accurately positioned so that the pin 38 coincides with the axis of rotation of the chair base as the inclination thereof is changed. The bracket is also formed and mounted with this positioning in mind.

The first pair of mounting tracks 28 are secured to the outer surface of the vertical bracket wall to receive the complemental tracks 29 to which the mobile unit 18 is secured. The tracks 29 may be secured to the mobile unit in any suitable fashion as there is no requirement that the tracks move relatively to the unit. Instead, they are immovably secured to the unit.

As noted, in the embodiment of FIGS. 12 and 13 the tracks 28 and 29 remain in the horizontal position at all times despite variations in the degree of tilt of the chair base. This is so, because although the bracket moves up and down with the chair, it is secured or clamped to the top of the ram rather than to the chair. Hence it cannot tilt with the chair. Instead, the chair and block 26 rotate about the pin 38 while the bracket 37, tracks 28 and 29 and the attached mobile unit remain level. Thus, the mobile unit moves up and down with the chair as well as fore and aft with respect thereto, but the unit must be manually moved along the tracks. This arrangement, while not providing the automatic adjustment of the embodiment of FIGS. 1–4, does provide the advantage of greater simplicity of construction and will satisfy the needs of a great many practitioners.

The locking arrangement used in embodiment of FIGS. 1–11 may be similarly employed in the embodiment of FIGS. 12 and 13.

In all embodiments of the invention, positioning of the fixed or remote unit is important. In this connection, the fixed unit should be placed to present minimum interference with rotation of the chair. If the unit is located so that the chair will rotate past it, maximum use of the operatory is attainable as the chair can be swung in both directions a distance limited only by the reasonably stretched length of the umbilical cord.

Selection of the components or instruments for the system is a matter of individual taste and they may include power units or waste disposal systems to be located in the fixed unit. All air, vacuum, water and electrical connections are either housed in or pass through the fixed unit. Also, special features such as radio or recorded music may be piped to the mobile unit to further add to patient comfort.

From the foregoing it will be seen that the present invention provides a major improvement in the science of dentistry by eliminating the so-called dental unit and replacing it with an attractive and extremely efficient mobile instrument housing mounted to move with the dental chair throughout its various attitudes and at the same time to be movable relative thereto while remaining in a vertical position in the most convenient operating locations.

Power for operation of the instruments is located remote from the instruments and at a completely out of the way location relative to the operating area.

It is evident, then, that the present invention answers a long felt need for enhanced working conditions and efficiency for the dentist and the provision of aesthetically pleasing arrangements from the standpoint of patient comfort.

Having described my invention, what I desire to claim and secure by Letters Patent is:

1. Dental operatory apparatus comprising in combination a dental chair, an elevating ram, means mounting said chair on said ram for up and down movement with said ram and for tilting movement about an axis transverse thereto, an instrument housing for holding instruments and associated lengths of instrument power lines, a source of power located remotely from said housing and chair, flexible connecting means interconnecting said housing and said remotely located power source, and mounting means mounting said instrument housing for up and down and rotational movement with said chair as well as substantially horizontal movement relative thereto, said mounting means comprising generally horizontally extending elongated first guide means attached to said chair, and second guide means attached to said housing, said second guide means being complemental to said first guide means and slidingly fitted thereto.

2. Apparatus according to preceding claim 1 in which said first guide means are rigidly attached to said chair to be tiltable therewith, and the means attaching said second guide means to said housing comprises a pivotal connection between said housing and said second guide means.

3. Apparatus according to preceding claim 1 in which said mounting means mounting said housing on said chair comprises a bracket rigidly secured to said chair only for up and down and rotational movement therewith, said bracket extending to one side of said chair, said elongated first guide means being rigidly attached to said bracket to extend horizontally, and said second guide means being rigidly attached to said housing.

4. Apparatus according to preceding claim 2 with the addition of clutch means operable between said first and second guide means to lock the same against relative movement.

5. Apparatus according to preceding claim 3 with the addition of clutch means operable between said first and second guide means to lock the same against relative movement.

6. Apparatus according to preceding claim 1 in which said housing comprises a closed container divided by a plurality of vertical baffles into a plurality of adjacent interior compartments each adapted to contain a looped length of dental instrumental power line, and an instrument seat on an upper portion of said container, said seat having a plurality of instrument seating openings therein each communicating with one of said interior compartments and each adapted to seat an instrument when the instrument is connected to one end of a length of power line in said compartment.

References Cited by the Examiner

UNITED STATES PATENTS

| | | | |
|---|---|---|---|
| 153,943 | 8/1874 | Gray | 32—22 X |
| 533,445 | 2/1895 | Denison | 32—22 |
| 2,214,774 | 9/1940 | Pieper | 32—22 |
| 3,089,741 | 5/1963 | Burton | 32—22 X |

RICHARD A. GAUDET, *Primary Examiner.*

ROBERT E. MORGAN, *Examiner.*